Feb. 13, 1923.
E. W. ROUNDS.
SPEED INDICATOR FOR AEROPLANES.
FILED JULY 30, 1921.
1,444,886.
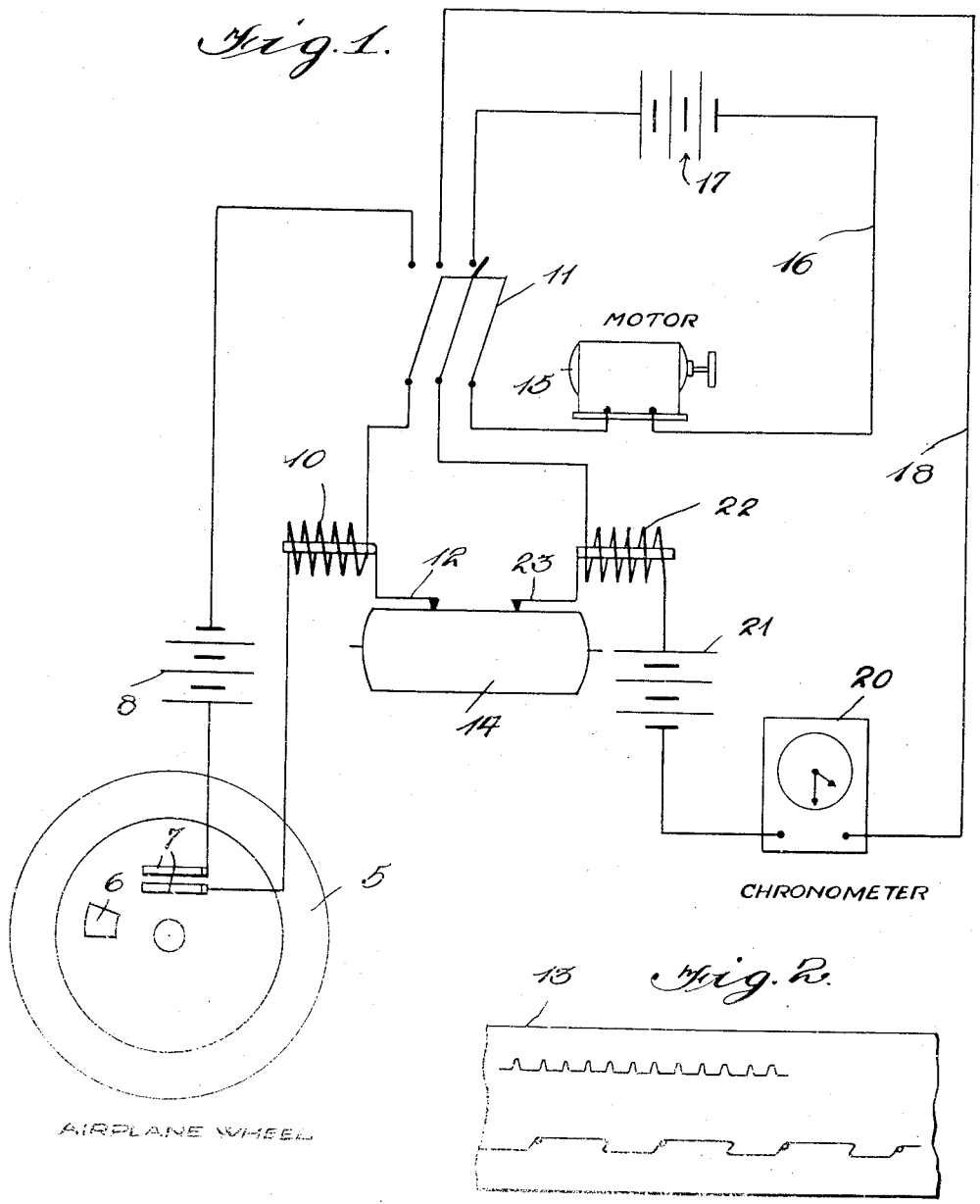

Patented Feb. 13, 1923.

1,444,886

UNITED STATES PATENT OFFICE.

EDWARD W. ROUNDS, OF WASHINGTON, DISTRICT OF COLUMBIA.

SPEED INDICATOR FOR AEROPLANES.

Application filed July 30, 1921. Serial No. 488,728.

*To all whom it may concern:*

Be it known that I, EDWARD W. ROUNDS, a citizen of the United States, residing at Washington, District of Columbia, have invented new and useful Improvements in Speed Indicators for Aeroplanes, of which the following is a specification.

This invention relates to measuring instruments and more particularly to chronographs for recording the ground speeds of moving bodies such as aeroplanes while taking off or landing and the associated method.

One of the problems now confronted in aviation is the ability to successfully determine when an aeroplane may safely be launched in a short space such as from the top of a turret with the usual run of from forty to fifty feet. As a means of making measurements necessary for this determination of safety and launching the present device has been developed to a simple and practical form which may be easily manufactured, assembled and installed on aeroplanes as and when desired.

A further object is to provide a device of the above general character which will be light in weight and compact in construction.

In the accompanying drawings there is illustrated diagrammatically in Figure 1 such parts of the invention and the wiring circuit as is necessary for those familiar with the subject to thoroughly understand the invention.

Figure 2 represents a section of the marking tape showing the indications thereon.

Referring now to the drawings in detail, 5 indicates the wheel of an aeroplane provided with a rotating sector 6 of perhaps 20°, an arc adapted to contact with two fingers 7 thereby to close a circuit through a battery 8 and solenoid 10 when the three-part switch 11 is closed. The solenoid or electro-magnet 10 is adapted to operate a stylus or pen 12 to make a mark upon a tape 13 shown in Figure 2 passing over a roller 14 which may be driven in any desired manner as by means of suitable connections not shown with a motor 15. This motor is in circuit 16 driven by any suitable source of power such as a battery 17 when the three-part switch 11 is closed. There is also controlled by this switch 11 a third circuit 18 in which is located a timing instrument such as chronometer 20, a battery or other source of power 21 for actuating solenoid 22 which in turn operates a second stylus 23 also adapted to make its mark upon the tape 13 as it passes over the roller 14. Both styluses are preferably on a line perpendicular to the direction of motion of the paper or tape for the purpose of registering seconds or fractions of seconds using a brake circuit in the chronometer as well as the moment of contact of the sector 6 with the fingers 7. The tape is preferably driven under the stylus at a rate of about 1" per second.

In operation the chronograph 20 is mounted complete in the aeroplane with the switch 11 open. The aeroplane is then taxied to position for the take-off and just before the start all switches are closed. The paper tape is then drawn along and a time record is made. As soon as the aeroplane wheel moves the contacts close and a record of the wheel revolutions is started. It is advisable to have the wheel in such a position that contact is just about to be made before the aeroplane starts to take off. During the run previous to the get-away the record shows such revolution of the wheel and from the parallel time record the speed can be easily calculated. After the plane has left the ground all switches are open in order not to use up the paper and batteries unnecessarily.

In landing a similar procedure is carried out except that the switches may be opened before the plane stops rolling as the first contacts will show the running speed. The wind speed should be measured by a portable anemometer on the field at the time of getting off and also at the time of landing in order that these factors may be taken into consideration in the final calculations.

It will thus be seen that the present device affords a means of accurately measuring the get-away speeds, landing speeds and length of run before getting off, acceleration during run, total resistance of airplane at low speeds, thrust of propellers, and any other information for which an accurate measure of ground speed at low velocities is needed.

It is, of course, to be understood that the present mechanism can be used in any type of machine and inasmuch as its operation is automatic on closing of the switch the device may be easily operated in coordination with the get-away and landing. The apparatus is light and requires no delicate apparatus with the exception of the break circuit chronometer. The current demands are small, as the device is only used for limits of fifteen to twenty seconds at a time; the weather conditions do not affect its operation and the human element is entirely eliminated during the making of the records.

It will thus be seen that the present invention is adapted to accomplish, among others, all of the objects and advantages herein set forth.

Without further analysis, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and, therefore, such adaptations should and are intended to be comprehended within the meaning and range of equivalency of the following claims.

What I claim is:—

1. The herein described method of measuring the getaways and landings of aeroplanes which consists of indicating on a moving tape a time element and indicating on the same tape in a line parallel thereto the number of revolutions of the aeroplane wheel during the time elements.

2. In an apparatus of the character described, in combination, an aeroplane wheel adapted to be rotated as the aeroplane takes off or lands, a moving tape, and means for indicating the time elements and the revolution of the aeroplane wheel on said tape.

3. In an apparatus of the character described, in combination, an aeroplane wheel adapted to be rotated as the aeroplane takes off or lands, a moving tape, means for indicating the time elements and the revolution of the aeroplane wheel on said tape, said means including a make and break chronometer and a make and break device associated with the aeroplane wheel.

4. In an apparatus of the character described, in combination, an aeroplane wheel, a make and break device associated therewith operable at each revolution, a record tape and means for indicating on said record tape each revolution of the wheel and means for driving said tape and indicating thereon elapsed time intervals.

5. In an apparatus of the character described, in combination, an aeroplane wheel, a make and break device associated therewith, a timing circuit, a moving tape, means for moving said tape and means for indicating on the tape elapsed time intervals and revolutions of the aeroplane wheel in parallel lines.

6. In an apparatus of the character described, in combination, an aeroplane wheel, a make and break device associated therewith, a timing circuit, a moving tape, means for moving said tape, means for indicating on the tape elapsed time intervals and revolutions of the aeroplane wheel in parallel lines and a suitable means for throwing said device into and out of operation.

Signed at Washington, District of Columbia, this 14th day of April, 1921.

EDWARD W. ROUNDS.